Jan. 6, 1925.  1,522,229
C. D. CARVER
HAY STACKER AND LOADER
Filed March 9, 1923  2 Sheets-Sheet 1

Inventor
C. D. Carver

Jan. 6, 1925.  1,522,229
C. D. CARVER
HAY STACKER AND LOADER
Filed March 9, 1923     2 Sheets-Sheet 2

Inventor
C. D. Carver

Patented Jan. 6, 1925.

1,522,229

UNITED STATES PATENT OFFICE.

CHARLES D. CARVER, OF PETERSBURG, ILLINOIS.

HAY STACKER AND LOADER.

Application filed March 9, 1923. Serial No. 624,050.

*To all whom it may concern:*

Be it known that CHARLES D. CARVER, a citizen of the United States, residing at Petersburg, State of Illinois, has invented certain new and useful Improvements in Hay Stackers and Loaders, of which the following is a specification.

This invention has reference to a hay stacker and loader and is intended to provide improved means for handling hay in the fields.

An object of the invention is to provide means for loading or stacking hay with minimum labor and with a saving in time, the said stacker being portable so as to be readily moved from place to place.

An additional object is to provide a hay stacker and loader made up of separable sections whereby it can be readily taken down or put up, as required.

Various other objects and advantages of the invention may become apparent from the following description.

In the drawing:—

Describing the invention in detail, 10 designates the chute of the device which is preferably constructed of planking of any suitable and desired length, and 11 indicates the side rails thereof. The chute is supported at an incline by a frame structure arranged below one end thereof, which structure embodies four uprights or standards 12 arranged in pairs on opposite sides of the chute and bolted to the latter, as shown at 13, so as to be removable. Uprights 12 are relatively connected by cross-braces 14 which are bolted to the upright so as to be likewise detachable. By reason of the detachable fastenings it is obvious that the device can be readily dismantled when required.

Figure 1:
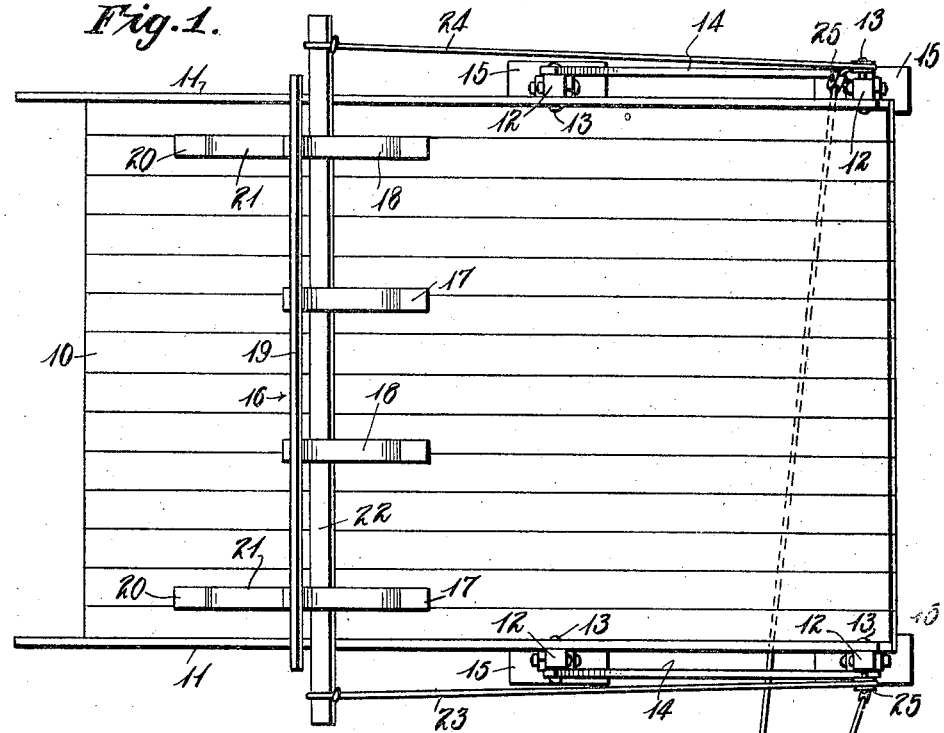
Figure 1 is a top plan view of the proposed invention.
Figure 4:
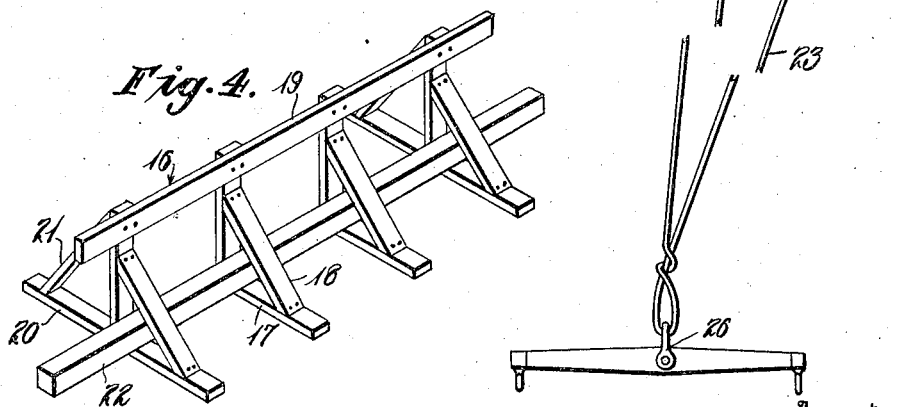
Figure 4 is a detailed view of the dummy rake.
Figure 2:
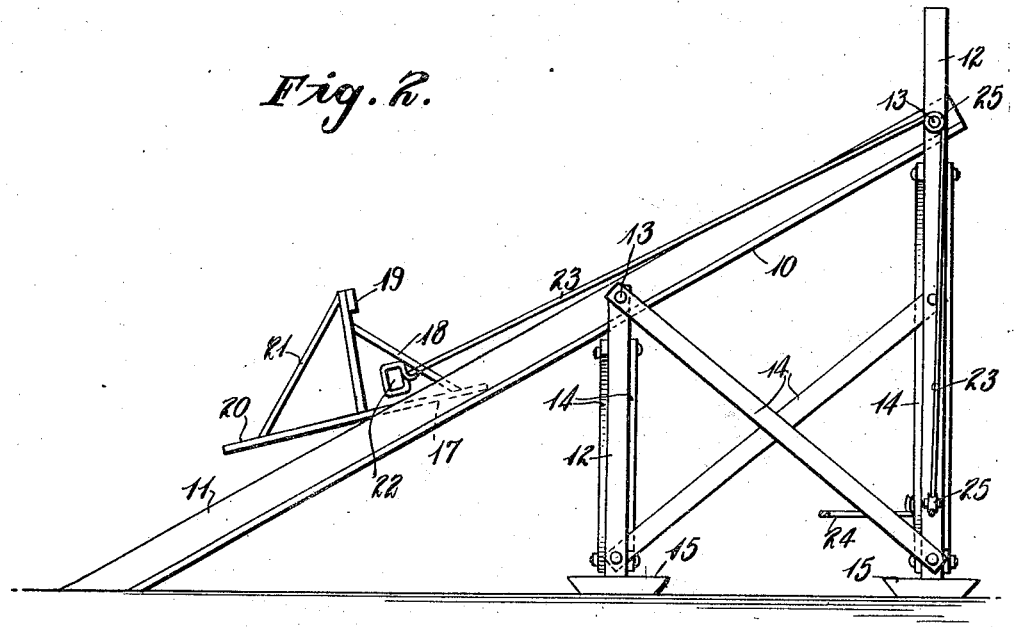
Figure 2 is a view thereof in side elevation.
Figure 3:
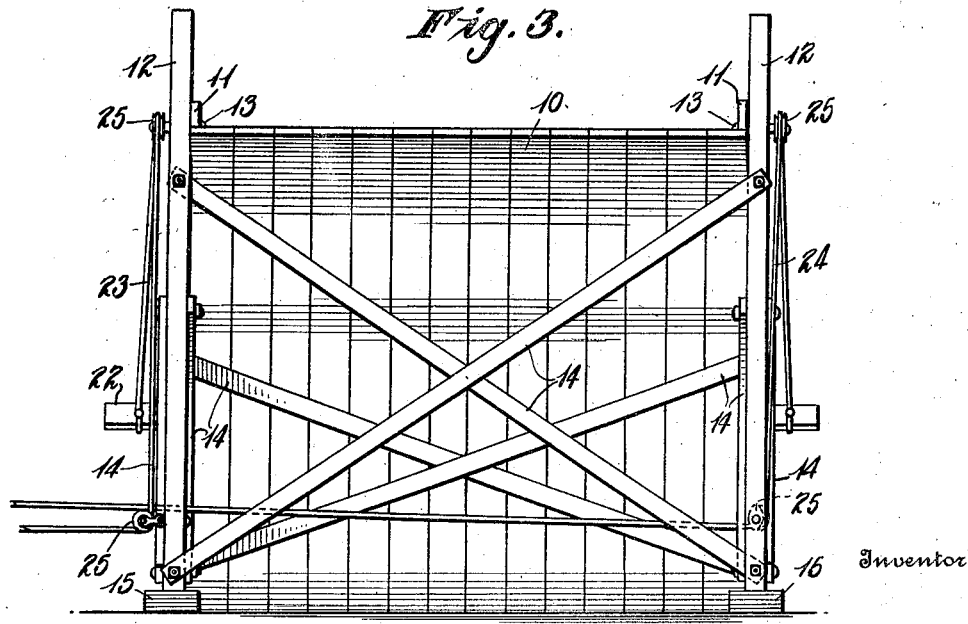
Figure 3 is a rear end elevation.

Skids 15 are arranged on the lower ends of the standards and enable the device to be moved over the ground so that the chute may be moved back as the stack is built. The hay is carried up the chute by means of the dummy rake 16, shown in Figure 4, which is constructed of a plurality of angle members 17 having each an angle brace 18 and being relatively connected adjacent their upper ends by a tie bar 19, the latter serving to maintain the angle members in properly spaced relations. The end units of the dummy rake are extended rearwardly as shown at 20 and are braced as shown at 21. This rake is drawn upwardly within the chute by means of a pull bar 22 extending transversely of the rake and between members 17 and 18. The pull bar is loosely positioned between the members and constitutes the fulcrum on which the rack is shiftable laterally and also circumferentially to some extent so that when the pull bar has been drawn to the upper end of the chute, the rack revolves forward and dumps the hay upon the stack. Connected to the ends of the pull bar are the terminals of draft cables 23 and 24, the latter passing over suitably arranged pulleys 25 and connecting with draft gear 26. It will thus be seen that a single horse is all that is necessary to draw the load up the chute so that it may be discharged onto the stack which is being formed.

In practice, the stacker can be built of steel, wood or any other selected material and of any dimensions required. It may be used both for stacking the hay or for loading the same into a wagon or other vehicle. When used for stacking hay in the field the bull rake (not shown) brings in the load to the chute and the dummy rake is dropped behind the load and then moved upwardly within the chute, carrying the hay with it until the latter is discharged from the upper end. As the discharged hay accumulates and reaches the desired height, the stacker is moved back, it being observed that, as the stack is being built, the rear frame presented by the end posts 12 and cross braces 14 serve to keep the hay in place.

No pitching of hay in the field is necessary for loading wagons or stacking, the hay dropping off on the wagon in the same manner as when stacking.

From the foregoing it is believed that the advantages and novel features of the invention can be readily understood and that further detailed description thereof is not required.

What is claimed is:

1. A hay stacker and loader comprising an inclined chute, a rake movable within the said chute and embodying a plurality of angle-shaped members having angle braces and a tie bar connecting the said members in relatively spaced relation, a pull bar loosely engaged between the said members and their angle braces, and draft means connected with said pull bar.

2. A hay loader and stacker comprising a chute, a pair of supporting uprights arranged on opposite sides of the chute and adjacent one end for supporting the latter at an incline, skids on the lower ends of the said uprights, cross braces connecting the said uprights, said uprights and braces being detachably connected to each other and to the said chute, a rake loosely disposed within the said chute, a removable pull-bar extending transversely through the said rake, pulleys carried by certain of the said uprights, cables trained over the said pulleys, said cables connecting at one end to the said pull-bar, and a draft element connected to the opposite ends of the cable.

3. A hay stacker and loader comprising an inclined chute having side rails, a pull-bar extending crosswise of the chute with its opposite ends resting on the said side rails upon which the said bar is adapted to slide when moved upwardly of the chute, draft means for moving the pull-bar upwardly of the chute, and a rake loosely mounted upon the said pull-bar and being shiftable both laterally and circumferentially thereof.

In testimony whereof I affix my signature.

CHARLES D. CARVER.